2,821,518
Patented Jan. 28, 1958

2,821,518

PROCESS OF PREPARING AN ORGANOPOLY-SILOXANE MODIFIED POLYESTER RESIN, THE PRODUCT THEREOF, AND ELECTRICAL CONDUCTOR COATED THEREWITH

Leonard E. Edelman and Sydney Robbins, Pittsburgh, Pa., assignors to Westinghouse Electric Corporation, East Pittsburgh, Pa., a corporation of Pennsylvania No Drawing. Application May 25, 1954
Serial No. 432,315

5 Claims. (Cl. 260—45.4)

The present invention relates to resinous materials and has particular reference to silicone modified polyester materials especially adapted for use as electrical insulation coatings.

Resinous materials used as insulation coatings on electrical apparatus should have high mechanical strength and should be heat stable at the temperatures frequently encountered in the service of such apparatus. A resinous electrical insulating coating to be completely satisfactory also should have, among other things, high dielectric strength and should undergo little, if any, thermal or oxidative decomposition at the elevated temperatures encountered in the use of such apparatus.

Heretofore, various resinous materials have been proposed for application to electrical apparatus as insulation coatings therefor. Polyester resins, for example, have been used with varying degrees of success. Such resins, in general, have satisfactory mechanical strength characteristics, but are not particularly heat stable at temperatures above 200° C. These resins, for example, frequently puff and crack upon prolonged exposure to such high temperatures.

Silicone resins, on the other hand, have relatively good thermal stability but do not have, in general, as satisfactory mechanical strength characteristics as the polyester resins especially at elevated temperatures. Silicone resins frequently become friable at high temperatures and flake off. Furthermore, they usually have relatively poor solvent and water resistance.

Attempts have been made to blend certain polyester resins and silicone resins by simple mechanical mixing procedures in an effort to realize the optimum desirable properties and characteristics of each in a single mixed resinous product. Such attempts have not been completely satisfactory, however, because of an inherent incompatibility of polyester resins with silicone resins.

The object of the present invention is to provide organopolysiloxane modified polyester resinous compositions which are adapted to form highly adherent insulating coatings that are resistant to flaking and powdering and which have exceptionally high thermal stability and particularly good mechanical strength characteristics even at elevated temperatures.

Another object of the invention is to provide organopolysiloxane modified polyester resinous compositions which, when applied to electrical apparatus, provide insulating material therefor having outstanding physical and electrical properties.

Other objects of the invention will, in part, be obvious and will, in part, appear hereinafter.

To indicate more fully the advantages and capabilities of the present invention, together with other and further objects thereof, reference is made to the following detailed description.

Broadly, the compositions of this invention comprise the products obtained by reacting (a) an organopolysiloxane having an average of 2.5 to 3.5 silicon bonded hydrolyzable hydrocarbonoxy radicals per molecule, a substantial proportion of the other valences of silicon, other than those satisfied by oxygen being satisfied by hydrocarbon groups, with (b) a saturated polyester resin composition containing at least as many reactive alcoholic hydroxyl groups as there are hydrolyzable hydrocarbonoxy radicals on the organopolysiloxane, said polyester resin being free from oil modification and comprising the product obtained by reacting an organic acid selected from the group consisting of isophthalic acid and terephthalic acid with a polyhydric alcohol.

The organopolysiloxanes (referred to hereinafter, for convenience, as "siloxanes,") used in preparing the compositions of this invention include those materials having the recurring structural unit Si—O—Si. Suitable siloxanes include only those having an average of 2.5 to 3.5 silicon bonded hydrolyzable hydrocarbonoxy radicals, represented by the general formula RO—, per molecule. The hydrolyzable hydrocarbonoxy radicals are selected from the group consisting of alkoxy and aryloxy groups. When RO— is an alkoxy group, the alkyl radical R may be either primary, secondary or tertiary, for example, methyl, ethyl, butyl, isopropyl, isobutyl, secondary butyl, tertiary butyl, hexyl, and the like. When RO— is an aryloxy group, the aryl radical R may be a phenyl group or a substituted phenyl group. It is preferred to use those siloxanes in which the hydrolyzable radical is an alkoxy group in which the alkyl radical is primary and contains from 1 to 8 carbon atoms per molecule.

The organopolysiloxanes employed in the practice of the present invention may be prepared by any one of several methods known in the art. One convenient method for preparing a siloxane which has been found to be particularly well suited for use in preparing the compositions of this invention, comprises hydrolyzing a mixture of a dialkoxy and trialkoxy silanes in each of which the non-functional silicon valences are satisfied by non-hydrolyzable hydrocarbon radicals. In carrying out such an hydrolysis, the dialkoxy and trialkoxy silanes are used in such proportions as to produce a product which is substantially a three silicon atom chain polymer. The reaction proceeds substantially as follows:

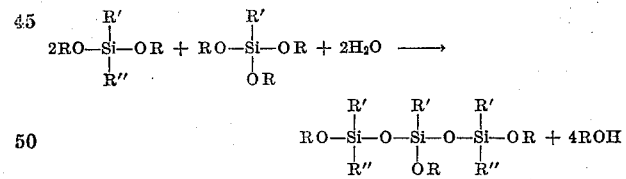

where RO— represents alkoxy groups and R' and R" are the same or different non-functional, non-hydrolyzable hydrocarbon radicals.

Examples of organopolysiloxanes containing silicon bonded alkoxy groups which are suitable for use in accordance with this invention include alkoxypolysiloxanes, for example, methoxy-, ethoxy-, propoxy-, isopropoxy-, butoxy-, polysiloxanes and the like; aryl alkoxypolysiloxanes, for example, phenyl, naphthyl, and the like alkoxypolysiloxanes; alkaryl alkoxypolysiloxanes, for example, tolyl, xylyl, and the like alkoxypolysiloxanes; aralkyl alkoxypolysiloxanes, for example, benzyl, phenylethyl, and the like alkoxypolysiloxanes; mixed alkyl and aryl alkoxypolysiloxanes, for example, methyl phenyl, ethyl phenyl, and the like alkoxypolysiloxanes; cycloaliphatic alkoxypolysiloxanes, for example, cyclohexyl alkoxypolysiloxanes; unsaturated aliphatic alkoxypolysiloxanes, for example, vinyl, allyl, and the like alkoxypolysiloxanes. Organopolysiloxanes containing substituted groups or atoms on the organic groups, e. g., halogens, etc., also are within the scope of this invention. A siloxane which has been found to be particularly suitable for use in accordance with this invention is dimethyltriphenyltrimethoxytrisiloxane having the average structure:

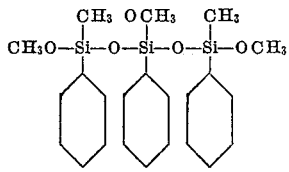

In preparing the novel silicone modified polyester resinous compositions of this invention, a siloxane of the character just described is reacted with a saturated polyester resin composition containing at least as many reactive alcoholic hydroxyl groups as there are hydrolyzable hydrocarbonoxy radicals on the siloxane. The reaction essentially is that of ester interchange. When employing an alkoxypolysiloxane, that material and the polyester resin are brought together and heated at a temperature within the range of about 130° C. to 200° C. until alcohol no longer is evolved. The polyester resin is present in an amount such that it will supply at least as many reactive alcoholic hydroxyl groups as there are hydrolyzable hydrocarbonoxy radicals on the siloxane. Thus, the polyester is reacted with from ½ to 1½ equivalent weights of siloxane per each equivalent weight of polyester. Preferably from ⅔ to 1 equivalent weight of siloxane is employed for each equivalent weight of polyester. An inert gas such as nitrogen, carbon dioxide or the like may be sparged through the reaction mixture to aid in carrying off the relatively low boiling alcohol liberated during the reaction. If desired, azeotropic distillation techniques also may be employed.

The polyester resin, to be suitable for use in accordance with this invention, must be free from oil modification and comprises the product obtained by reacting materials selected from the group consisting of isophthalic acid and terephthalic acid with polyhydric alcohol.

It is essential, in order to produce compositions having satisfactory thermal stability, to use either isophthalic or terephthalic acid. These acids form esters having excellent heat stability. Other dicarboxylic acids and anhydrides thereof are not desirable for use in this invention. Phthalic anhydride, for example, does not yield a satisfactory composition because it sublimes readily from compositions modified therewith when such compositions are exposed to high temperatures.

The alcohols employed in forming the saturated polyester resinous materials used in this invention comprise polyhydric alcohols including glycerine, ethylene glycol, propylene glycol, pentaerythritol, neopentalene glycol and the like. Particularly satisfactory results are obtainable when a mixture of glycerine and ethylene glycol is used in preparing the polyester. The use of this alcohol mixture results in the formation of a resinous coating composition which is tougher and cures more quickly than a resin made from any single dihydric alcohol. Preferably, the glycerine comprises from 25% to 75% by weight of the glycerine-ethylene glycol mixture.

The saturated polyester resin composition used in accordance with this invention may be prepared in accordance with usual esterification procedures as, for example, by heating the isophthalic or terephthalic acid and polyhydric alcohol under reflux and, if desired, in the presence of an esterification catalyst. For ease of esterification, it is preferred to employ the terephthalic acid in the form of its methyl ester.

More complete esterification may be obtained when azeotropic distillation procedures are employed to carry off the water of reaction formed during the esterification. The removal of water during the esterification reaction may be facilitated further by carrying out the esterification in the presence of an organic liquid such as high boiling naphtha or the like or by passing an inert gas such as carbon dioxide or nitrogen through the reactants.

In the esterification reaction the ratio of hydroxyl groups (supplied by the polyhydric alcohol) to the carboxyl groups (supplied by the isophthalic or terephthalic acid) preferably is adjusted in such manner that the resultant ester product contains free, unesterified hydroxyl groups. Preferably, the polyhydric alcohol and isophthalic or terephthalic acid are employed in amounts such that a ratio of hydroxyl groups to carboxyl groups of at least 2 to 1 is present in the esterification reaction mixture. This assures the formation of an ester product which will contain at least two equivalents of residual unesterified hydroxyl groups per molecule.

From 5% to 95% by weight of the coreacted siloxane and polyester resinous film forming material prepared as described above is dissolved in from 95% to 5% by weight of a volatile organic solvent to provide a varnish composition which may be applied to members as a coating and when baked produces resinous films capable of enduring prolonged service at elevated temperatures. In preparing such varnish compositions, various suitable volatile organic solvents may be employed. These include ketones, for example, methyl cyclo-hexanone, methyl isobutyl ketone, mesityl oxide, methyl n-amyl ketone, and di-isobutyl ketone; esters, for example, glycol diacetate and butyl lactate; coal tar solvents, for example, tetralin, benzene, xylene and toluene; higher alcohols such as butanol and benzyl alcohol; nitroparaffins, especially those containing from 1 to 5 carbon atoms, for example, nitromethane, 1-nitropropane, 2-nitropropane, nitrobutanes, and nitropentanes; chlorinated hydrocarbons, for example, carbon tetrachloride, pentachlorethane, and ethylene dichloride, hydrocarbon-substituted ethylene glycol ethers, for example, ethyl ether of ethylene glycol and butyl ether of ethylene glycol; and mixtures of any two or more of such organic solvents.

The following examples illustrate siloxane modified polyester resins prepared in accordance with the present invention. The parts given are by weight unless otherwise indicated.

*Example I*

| | |
|---|---|
| Ethylene glycol | ½ mole+10% excess. |
| Glycerine | 1½ mole+10% excess. |
| Isophthalic acid | 1 mole. |
| Dimethyltriphenyltrimethoxytrisiloxane | ⅔ mole. |

The ethylene glycol and glycerine are heated at a temperature of about 180° C. with $CO_2$ bubbling through at a moderate rate. The isophthalic acid then is added in three equal portions, the mixture being maintained at 200° to 210° C. after each addition until the mixture is clear. After the final addition the temperature of the mixture is permitted to rise to 220° C. and it is held there for approximately 40 minutes, at the end of which time the mixture has an acid number of 23. After cooling to 150° C., the dimethyltriphenyltrimethoxytrisiloxane is added and the temperature is slowly raised to 190° C. The mixture is held at this temperature until about 56 grams of methanol have been distilled off. The reaction then is terminated by cooling and adding to the reaction product about 50% by weight of a solvent mixture of which about two-thirds by volume is 2-ethoxy ethanol and one-third is xylene. The varnish is then filtered and may be used at once or packaged for later use.

A quantity of the siloxane modified polyester varnish prepared in accordance with the procedure described in Example I was applied to glass plates in the form of three mil (wet) thick films. After baking at 200° C. for thirty minutes, the films were found to be extremely hard and tough, having a Sward hardness of 58.

Another quantity of the varnish was cast in the form of a solid cake of approximately ⅛ inch thickness by baking a quantity of the varnish in an aluminum dish at 150° C. for six hours. One half of the cake was heated in highly refined petroleum oil at 120° for 48 hours after which it was found that the cake had increased in hardness from 35 to 75 (Shore Durometer A2). No signs of stringiness or swelling were observed.

A piece of glass cloth 4 mils in thickness was dip-coated in another portion of the varnish to a total thickness of 7 mils, in two passes. After each pass the treated cloth was given a short bake to drive off the solvent and to set the film. The coated cloth then was aged in an oven at 200° C. At intervals, the treated cloth was removed from the oven and placed between electrodes and subjected to a potential of 550 volts per mil of thickness. The film did not exhibit any dielectric breakdown under these test conditions until after the passage of 18 days at 200° C. plus an additional 11 days at 250° C.

*Example II*

Ethylene glycol _____ 1 mole+20% excess.
Glycerine _____ 1 mole.
Terephthalic acid _____ 1 mole.
Trimethyltriphenyl-
  dimethoxytrisiloxane _____ ⅔ mole.

The ingredients are reacted in the same manner as described in Example I with the exception that the terephthalic acid and mixed alcohols are reacted to an ester having an acid number of 27. After the addition of the siloxane, the bath is held at a temperature of about 190° for about 1 hour or until the desired viscosity is reached. It is then admixed with about 30% of a solvent consisting of 2-ethoxy ethanol and xylene as described in Example I and filled into suitable containers. Baked films of this varnish are similarly stable at high temperatures as those of Example I.

*Example III*

Ethylene glycol _____ 2 moles+10% excess.
Methyl ester of terephthalic acid _ 1 mole.
Dimethyltriphenyltrimethoxy-
  trisiloxane _____ ⅔ mole.

The ingredients are reacted in accordance with the manner described in Example I and a varnish prepared therefrom. The varnish so obtained does not cure as rapidly as do the varnishes of Examples I and II, but it has a better flexural strength than either of those varnishes. Furthermore, baked films of the varnish of this example are as stable at high temperatures as those prepared in accordance with the procedures set forth in Examples I and II.

The foregoing examples and test results demonstrate that the siloxane modified polyester resin compositions of this invention provide excellent insulation varnish coating materials for electrical apparatus intended for use at relatively high temperatures. The varnishes are quite thermally stable and possess excellent physical properties.

The resinous products of this invention, in addition to being exceptionally well suited for use as electrical insulation coating varnishes, also are suitable for use as impregnating varnishes for high voltage generators, motors, transformers, and the like. Field coils of generators, stators of motors and transformer coils, for example, may be dipped in the varnish of this invention and baked to provide insulating coatings thereon. These coils and stators comprise insulated wire coated with an enamel, and often include fibrous materials such as glass fiber cloth applied as insulation to the wire.

Furthermore, when formulated with pigments such as titanium dioxide, silica, iron oxide, and the like, these compositions provide excellent baking enamels for application to home appliances such as ranges and driers, industrial equipment, and the like.

While the present invention has been disclosed with reference to particular embodiments and examples, it will be understood, of course, that modifications, substitutions, and the like may be made therein without departing from the true scope of the invention.

We claim as our invention:

1. A process for preparing a resinous composition consisting of, (1) admixing only a polyhydric alcohol with an acid selected from the group consisting of isophthalic acid, terephthalic acid, and methyl esters of terephthalic acid, the alcoholic and acidic components being employed in amounts sufficient to provide at least two alcoholic hydroxyl groups for each acidic carboxyl group, (2) heating the mixture to a temperature of from 200° C. to 210° C. for a period of time sufficient to produce a resinous polyester free from oil modification having an acid number of from 23 to 27 whereby the polyester is prevented from gelling, (3) removing water of esterification formed during the reaction, (4) cooling the resinous polyester to 150° C., (5) admixing with the polyester an organopolysiloxane having an average of three silicon atoms per molecule, the siloxane having an average of from 2.5 to 3.5 hydrolyzable hydrocarbonoxy groups attached to silicon, the remaining valences of silicon other than those satisfied by oxygen being satisfied with hydrocarbon groups, the polyester resin being present in an amount sufficient to provide at least one hydroxy group for each hydrolyzable hydrocarbonoxy group on the siloxane, and (6) heating the resultant polyester-organopolysiloxane mixture at a temperature of from 130° C. to 200° C.

2. The process as set forth in claim 1 wherein the organopolysiloxane comprises dimethyltriphenyltrimethoxytrisiloxane.

3. The process as set forth in claim 1 wherein the polyhydric alcohol comprises a mixture of ethylene glycol and glycerine.

4. A product produced by the process set forth in claim 1.

5. An electrical member comprising an electrical conductor, a coating of solid cured resinous insulation disposed about said conductor, said insulation comprising the heat treated product derived by a process consisting of (1) admixing only a polyhydric alcohol with an acid selected from the group consisting of isophthalic acid, terephthalic acid, and methyl esters of terephthalic acid, the alcoholic and acidic components being employed in amounts sufficient to provide at least two alcoholic hydroxyl groups for each acidic carboxyl group, (2) heating the mixture to a temperature of from 200° C. to 210° C. for a period of time sufficient to produce a resinous polyester free from oil modification having an acid number of from 23 to 27 whereby the polyester is prevented from gelling, (3) removing water of esterification formed during the reaction, (4) cooling the resinous polyester to 150° C., (5) admixing with the polyester an organopolysiloxane having an average of three silicon atoms per molecule, the siloxane having an average of from 2.5 to 3.5 hydrolyzable hydrocarbonoxy groups attached to silicon, the remaining valences of silicon other than those satisfied by oxygen being satisfied with hydrocarbon groups, the polyester resin being present in an amount sufficient to provide at least one hydroxyl group for each hydrolyzable hydrocarbonoxy group on the siloxane, and (6) heating the resultant mixed polyester and organopolysiloxane components at a temperature of from 130° C. to 200° C.

References Cited in the file of this patent

UNITED STATES PATENTS

| | | |
|---|---|---|
| 2,587,295 | Doyle et al. | Feb. 26, 1952 |
| 2,686,739 | Kohl | Aug. 17, 1954 |